(12) United States Patent
Croteau et al.

(10) Patent No.: US 10,222,001 B2
(45) Date of Patent: Mar. 5, 2019

(54) HIGH CONFORMAL PRESSURE VESSEL

(71) Applicant: United Technologies Corporation, Farmington, CT (US)

(72) Inventors: Paul F. Croteau, Columbia, CT (US); John P. Wesson, West Hartford, CT (US); Andrzej Ernest Kuczek, Bristol, CT (US); Matthew E. Lynch, Canton, CT (US); Tahany Ibrahim El-Wardany, Bloomfield, CT (US); Ellen Y. Sun, South Windsor, CT (US); Wenping Zhao, Glastonbury, CT (US); Daniel V. Viens, Mansfield Center, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 319 days.

(21) Appl. No.: 15/035,060

(22) PCT Filed: Sep. 8, 2014

(86) PCT No.: PCT/US2014/054552
§ 371 (c)(1),
(2) Date: May 6, 2016

(87) PCT Pub. No.: WO2015/069376
PCT Pub. Date: May 14, 2015

(65) Prior Publication Data
US 2016/0290564 A1 Oct. 6, 2016

Related U.S. Application Data (60) Provisional application No. 61/901,524, filed on Nov. 8, 2013.

(51) Int. Cl.
*F17C 13/06* (2006.01)
*F17C 1/14* (2006.01)
(Continued)

(52) U.S. Cl.
CPC ............... *F17C 13/06* (2013.01); *F17C 1/00* (2013.01); *F17C 1/14* (2013.01); *F17C 1/16* (2013.01);
(Continued)

(58) Field of Classification Search
CPC .... F17C 13/06; F17C 1/14; F17C 1/16; F17C 1/00; F17C 1/005; B65D 21/0205; B65D 21/0202; B65D 21/02; B65D 21/0208
(Continued)

(56) References Cited

U.S. PATENT DOCUMENTS

| | | | | | |
|---|---|---|---|---|---|
| 1,668,179 | A | * | 5/1928 | Williams | ................ F17C 1/08 138/115 |
| 2,790,489 | A | * | 4/1957 | Denison, Jr. | ............ F02K 9/605 137/266 |

(Continued)

FOREIGN PATENT DOCUMENTS

| | | | | |
|---|---|---|---|---|
| EP | 1426673 | | 6/2004 | |
| FR | 2671542 | A1 * | 7/1992 | ....... B60K 15/03177 |

(Continued)

OTHER PUBLICATIONS

Translation of EP1426673, Heurtaux et. al., Jun. 9, 2004, pp. 2-7.*
(Continued)

*Primary Examiner* — Robert J Hicks
(74) *Attorney, Agent, or Firm* — Cantor Colburn LLP (57) ABSTRACT

A pressure vessel configured to store a pressurized fluid is provided including a plurality of lobes. Each lobe includes at least one vertically arranged interior wall. The plurality of lobes are positioned in a side by side configuration such that
(Continued)

a first interior wall of a first lobe is positioned adjacent a second interior wall of a second adjacent lobe. The first interior wall and the second interior wall are configured to contact one another at a first point of tangency. A first tangent intersects the first lobe at the first point of tangency and a second tangent intersects the second lobe at the first point of tangency. The first tangent and the second tangent are separated by about 120 degrees.

20 Claims, 9 Drawing Sheets (51) Int. Cl.
*F17C 1/16* (2006.01)
*F17C 1/00* (2006.01)

(52) U.S. Cl.
CPC ............... *F17C 2201/0152* (2013.01); *F17C 2201/056* (2013.01); *F17C 2203/0617* (2013.01); *F17C 2203/0636* (2013.01); *F17C 2203/0663* (2013.01); *F17C 2205/0146* (2013.01); *F17C 2209/2109* (2013.01); *F17C 2209/219* (2013.01); *F17C 2209/2181* (2013.01); *F17C 2209/221* (2013.01); *F17C 2209/234* (2013.01); *F17C 2221/012* (2013.01); *F17C 2221/031* (2013.01); *F17C 2221/033* (2013.01); *F17C 2221/035* (2013.01); *F17C 2223/0123* (2013.01); *F17C 2223/0153* (2013.01); *F17C 2223/036* (2013.01); *F17C 2260/018* (2013.01); *F17C 2270/0168* (2013.01); *F17C 2270/0178* (2013.01); *Y02E 60/321* (2013.01)

(58) Field of Classification Search
USPC .......... 220/582, 581, 23.83, 23.8, 23.2, 678, 220/501, 502; 206/6; 141/170, 210, 35, 141/178, 202; 137/255, 263, 266, 265, 137/262, 259, 256
See application file for complete search history.

(56) References Cited

U.S. PATENT DOCUMENTS

| | | | | |
|---|---|---|---|---|
| 3,319,433 A | * | 5/1967 | Pauliukonis | F17C 3/08 |
| | | | | 220/564 |
| 3,409,061 A | * | 11/1968 | Struble, Jr. | F17C 3/02 |
| | | | | 206/524.1 |
| 4,946,056 A | | 8/1990 | Stannard | |
| 5,577,630 A | | 11/1996 | Blair et al. | |
| 6,095,367 A | | 8/2000 | Blair et al. | |
| 7,100,640 B2 | * | 9/2006 | Kirma | B64D 11/02 |
| | | | | 137/266 |

FOREIGN PATENT DOCUMENTS

| | | |
|---|---|---|
| GB | 2121945 | 1/1984 |
| JP | 2005155776 | 6/2016 |

OTHER PUBLICATIONS

Translation of FR2671542, Grisel, Jul. 17, 1992, p. 3.*
International Application No. PCT/US2014/054552 International Search Report and Written Opinion dated Feb. 25, 2015, 9 pages.

* cited by examiner

HIGH CONFORMAL PRESSURE VESSEL

CROSS-REFERENCE TO RELATED APPLICATION

This application claims the benefit of U.S. provisional patent application Ser. No. 61/901,524 filed Nov. 8, 2013, the entire contents of which are incorporated herein by reference.

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

BACKGROUND OF THE INVENTION

Exemplary embodiments of the invention generally relate to a pressure vessel to be used for transport, storage, or utilization of a pressurized fluid, and more particularly, to an optimized pressure vessel having a high rate of conformity.

Pressure vessels are widely used to store liquids and gases under pressure. The storage capacity of a pressure vessel depends on the internal volume of the pressure vessel and the pressure that the vessel is capable of safely containing. In addition to its storage capacity, the size, internal shape, external shape, and weight of the pressure vessel are customized for a particular application.

One growing application of pressure vessels is the storage of compressed natural gas (CNG). Relatively large multi-lobed tanks for the transport or storage of pressurized fluids exist. This basic technology may be extended to enable relatively inexpensive and commercially feasible fabrication of smaller tanks, which are capable of handling fluids under pressure. The current use of industry standard cylinders for CNG in automotive vehicles is limited because the as volumetric density of a cylinder is low. A tank having enough natural as to achieve a vehicle driving range comparable to conventional automobiles would be large and bulky and would require space that generally would be otherwise usable cargo space.

BRIEF DESCRIPTION OF THE INVENTION

According to one embodiment of the invention, a pressure vessel configured to store a pressurized fluid is provided including a plurality of lobes. Each lobe includes at least one vertically arranged interior wall. The plurality of lobes are positioned in a side by side configuration such that a first interior wall of a first lobe is positioned adjacent a second interior wall of a second adjacent lobe. The first interior wall and the second interior wall are configured to contact one another at a first point of tangency. A first tangent intersects the first lobe at the first point of tangency and a second tangent intersects the second lobe at the first point of tangency. The first tangent and the second tangent are separated by about 120 degrees.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
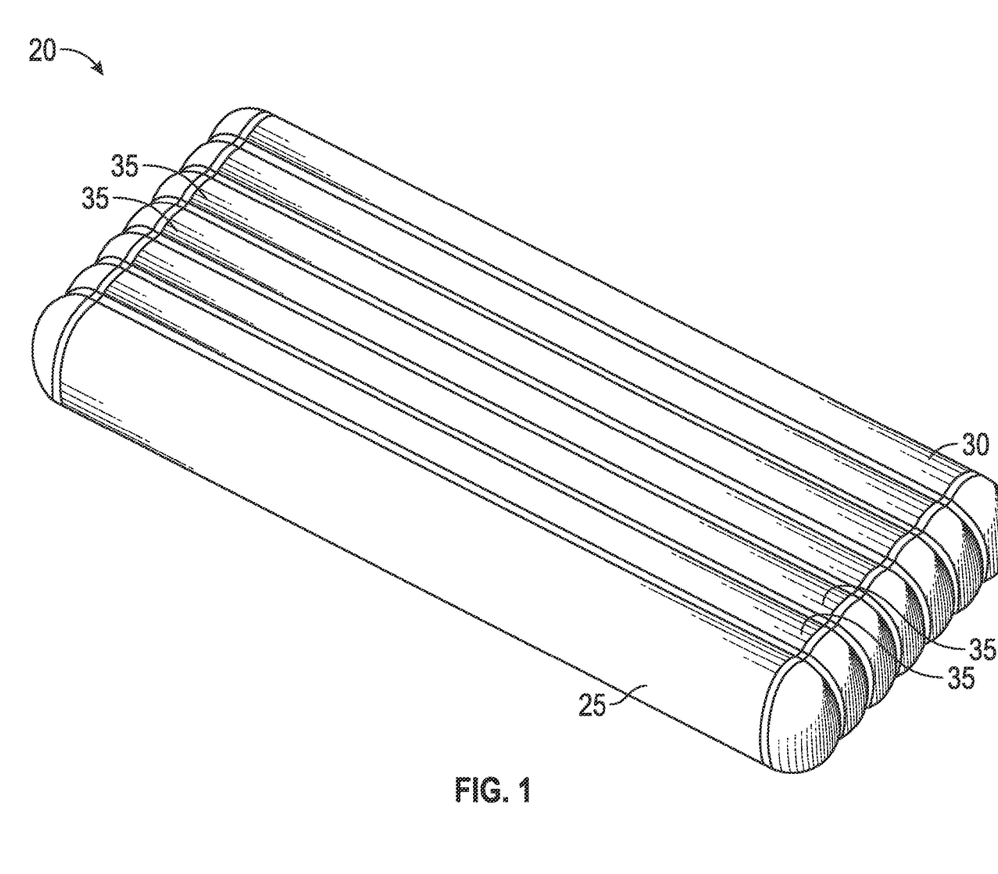
FIG. 1 is a perspective view of a pressure vessel configured to store a pressurized fluid according to an embodiment of the invention.

Referring now to FIG. 1, an example of a pressure vessel or tank 20 configured to store a high pressure fluid or gas is illustrated. Exemplary fluids or gases that may be stored within the pressure vessel 20 include, but are not limited to, compressed natural gas (CNG), hydrogen, propane, methane, air, and hydraulic fluid for example. The pressure vessel 20 includes a plurality of generally cylindrical lobes including a left end lobe 25 and a right end lobe 30. In the illustrated, non-limiting embodiment, the pressure vessel 20 additionally includes a plurality of substantially identical interior lobes 35, such as five interior lobes 35 for example; however a pressure vessel 20 having any number of interior lobes 35 is within the scope of the invention. The left end lobe 25, one or more interior lobes 35, and the right end lobe 30 are positioned side by side and are joined together by a plurality of bonds (see FIG. 4). As a result of this arrangement, the overall configuration of the pressure vessel 20 is generally rectangular in shape.

Referring now to FIGS. 2-5, the individual lobes 25, 30, 35 of the pressure vessel 20 are provided in more detail. The left end lobe 25 and the right end lobe 30 are substantially identical and are arranged such that the right end lobe 30 is rotated 180 degrees relative to the left end lobe 25, or are arranged as a mirror image of one another. The end lobes 25, 30 include a generally cylindrical outer wall 40 having a first thickness. An interior wall 45 extends generally vertically between a first end 42 and a second end 44 of the cylindrical outer wall 40 and has a thickness equal to half that of the outer wall 40. In one embodiment, the interior wall 45 is integrally formed with the ends 42, 44 of the cylindrical outer wall 40. At least a portion of the curvature of the cylindrical outer wall 40 is defined by a radius R. In one embodiment, the portion of the outer wall 40, opposite the interior wall 45, includes a circular shape or curve generally of a 240 degree angle as defined by the radius R. Consequently, the overall height of the end lobes 25, 30 is equal to double the length of the radius R of the cylindrical outer wall 40. The vertical interior wall 45 is generally parallel to and spaced apart from a vertical plane P that includes the origin of the radius R that defines the curvature of the outer wall 40. In one embodiment, the distance between the interior wall 45 and the parallel vertical plane P is about half the length of the radius R. As a result, the end lobes 25, 30 generally have a width equal to about one and a half the length of the radius of curvature R of the outer wall 40.

Figure 2:
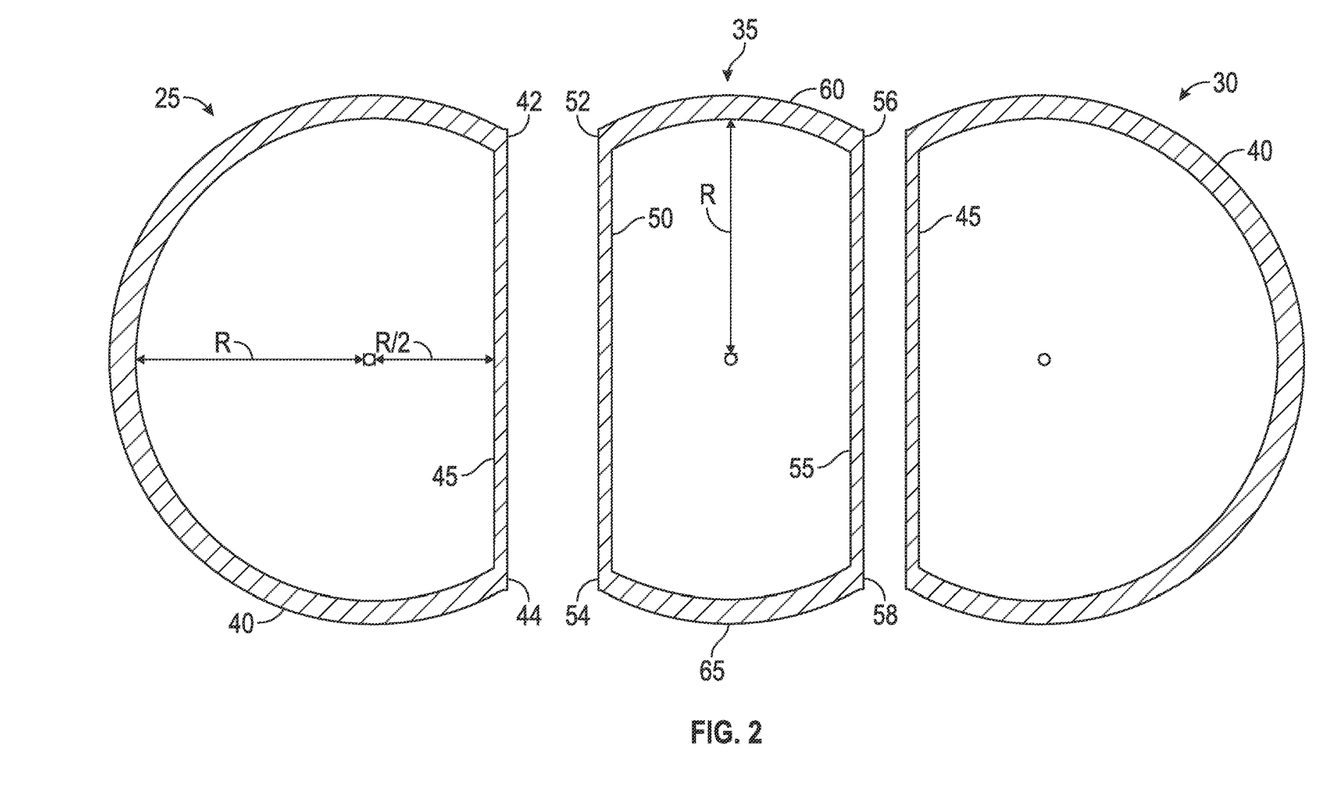
FIG. 2 is an exploded end view of a portion of the pressure vessel according to an embodiment of the invention.
Figure 3:
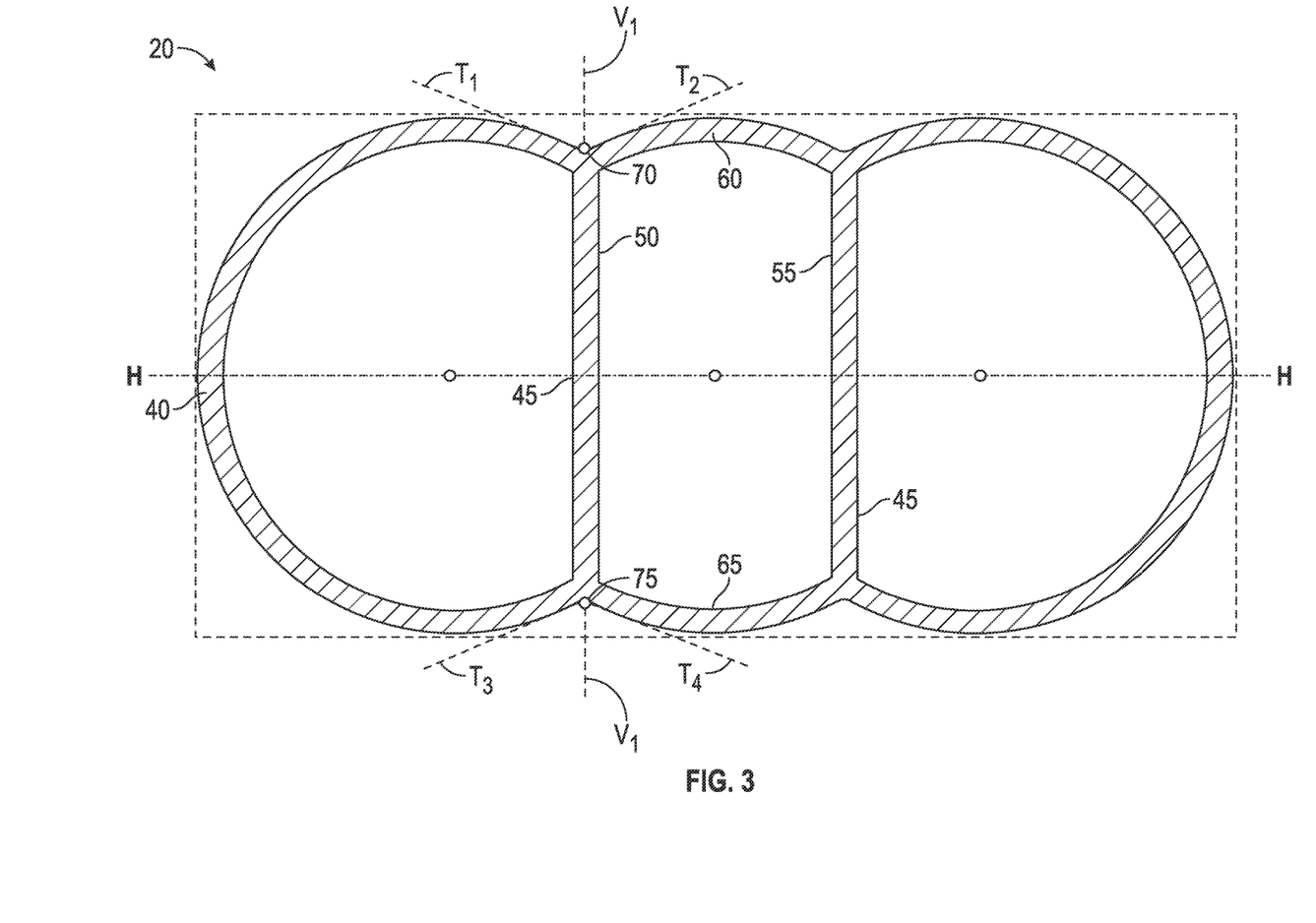
FIG. 3 is an end view of an assembled portion of the pressure vessel according to an embodiment of the invention.

The illustrated interior lobe 35 includes a vertically arranged first interior sidewall 50 and second interior sidewall 55, separated from one another by a distance. In one embodiment, the width of the interior lobe 35 is generally equal to the radius of curvature R of the end lobes 25, 30. The thicknesses of the first interior sidewall 50 and the second interior sidewall 55 are identical and equal to the thickness of the interior wall 45 of the end lobes 25, 30. A first outside wall 60 extends between a first end 52 of the first interior sidewall 50 and a first end 56 of the second interior sidewall 55. Similarly, a second outside wall 65 extends between a second end 54 of the first interior sidewall 50 and a second end 58 of the second interior sidewall 55. The thickness of the first and second outside walls 60, 65 is substantially identical to the thickness of the curved outer all 40 of the end lobes 25, 30. In one embodiment, the plurality of interior walls 50, 55 and the plurality of outside walls 60, 65 are integrally formed.

The curvature of the first outside wall 60 and the second outside wall 65 may be defined by a circular shape or curve generally of a 60 degree angle by a radius R. In one embodiment, the radius of curvature R of the interior lobe 35 is substantially identical to the radius of curvature R of the end lobes 25, 30. Consequently, the distance between the first curved wall 60 and the second curved wall 65 is double the length of the radius of curvature R, and is therefore, substantially equal to the height of the end lobes 25, 30.

When the pressure vessel 20 is assembled, each interior wall 45, 50, 55 is positioned directly adjacent another interior nail 45, 50, 55. For example, in a pressure vessel 20 not having any interior lobes 35, the interior wall 45 of the left end lobe 25 is arranged next to the interior wall 45 of the right end lobe 30. In a pressure vessel 20 having a single interior lobe 35, the first interior sidewall 50 abuts the interior wall 45 of the left end lobe 25 and the second interior sidewall 55 abuts the interior wall 45 of the right end lobe 30. In embodiments including a plurality of interior lobes 35, the second interior sidewall 55 of at least one of the interior lobes 35 is arranged next to a first interior sidewall 50 of an adjacent interior lobe 35. The distance between the origin of the radius of curvature R of an interior lobe and the origin of the radius of curvature R an adjacent lobe, either an end lobe 25, 30 or another interior lobe 35, is generally equal to the length of the radius of curvature R. In addition, the overall width of the pressure vessel 20 is generally equal to the sum of three and the total number of interior lobes 35 multiplied by the length of the radius of curvature R.

When the lobes 25, 30, 35 of the pressure vessel 20 are positioned side by side, two adjacent lobes, such as a left end lobe 25 and a right end lobe 30, a left end lobe 25 and an interior lobe 35, an interior lobe 35 and a right end lobe 30, or two interior lobes 35 for example, are configured to contact one another at a first and second point of tangency 70, 75. As illustrated in FIG. 3, the first point of tangency formed between the left end lobe 25 and the interior lobe 35 are arranged within a vertical plane V1 extending between the interior wall 45 and the first interior sidewall 50. A first tangent T1 is substantially perpendicular to radius of the curved outer wall 40 of left lobe 25 at the first point of tangency 70. Similarly, a second tangent T2 extends perpendicularly to the radius of the curved outside surface 60 of the interior lobe 35 at the first point of tangency 70. In one embodiment, the first tangent T1 and the second tangent T2 are separated from one another and from the vertical plane extending between the adjacent interior walls 45, 50 by a 120 degree angle.

In one embodiment, the pressure vessel 20 is symmetrical about a horizontal plane extending through the origins of the radius of curvature R of each lobe 25, 30, 35. As a result, the second point of tangency 75 is arranged within the same vertical plane V1 extending between the interior walls 45, 50 of the adjacent left end lobe 25 and interior lobe 35. A first tangent 13 extends perpendicular to the radius of the curved outer wall 40 of left lobe 25 at the second point of tangency 75. Similarly, a second tangent T4 is arranged substantially perpendicular to the radius of the curved outside surface 65 of the interior lobe 35 at the second point of tangency 75. The first tangent 13 and the second tangent 14 are similarly arranged at a 120 degree angle to one another and the vertical plane V1. Although the first and second point of tangency are described herein with respect to the interface between a left end lobe 25 and an interior lobe 35, a similar first and second point of tangency 70, 75 exists at the interface between each pair of adjacent lobes.

Figure 4:
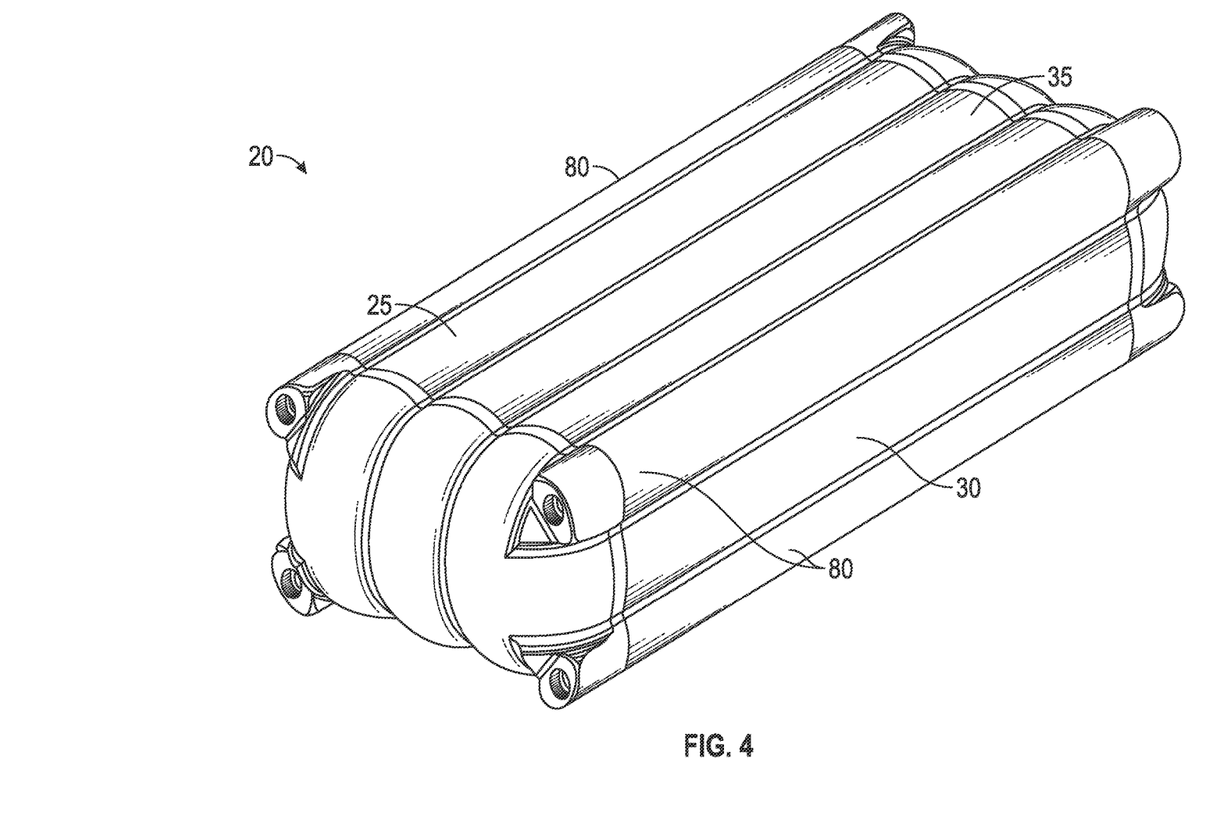
FIG. 4 is a perspective view of another pressure vessel according to an embodiment of the invention.
Figure 5:
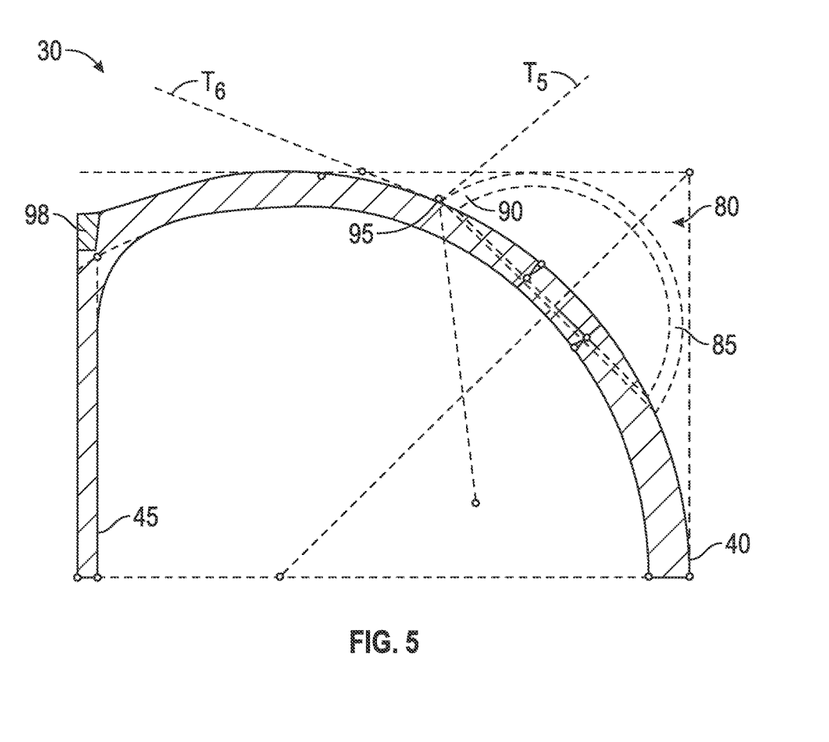
FIG. 5 is a cross-sectional view of an end lobe of a pressure vessel according to an embodiment of the invention.

Referring now to FIGS. 4 and 5, the end lobes 2 may include at least one additional cylindrical segment 80 integrally formed with the curved outer wall 40 at a 45 degree angle from the horizontal plane H extending through the origin of the radius of curvature R. The radius of the at least one cylindrical segment 80 extends about 180 degrees to form a semi-circular shape such that the overall height and width of the pressure vessel 20 remain substantially constant. In addition, the thickness of the wall 85 of the cylindrical segment 80 is substantially less than the thickness of the curved outer wall 40. A first end 90 of the wall 85 of the cylindrical segment 80 is configured to contact a portion of the curved outer wall 40 at a point of tangency 95. A first tangent T5 is substantially perpendicular to the radius of the wall 85 of the cylindrical segment 80 at the point of tangency 95 and a second tangent T6 is substantially perpendicular to radius of the curved outer wall 40, at the point of tangency 95. The first tangent T5 and the second tangent T6 are separated from one another by a 120 degree angle.

Figure 6:
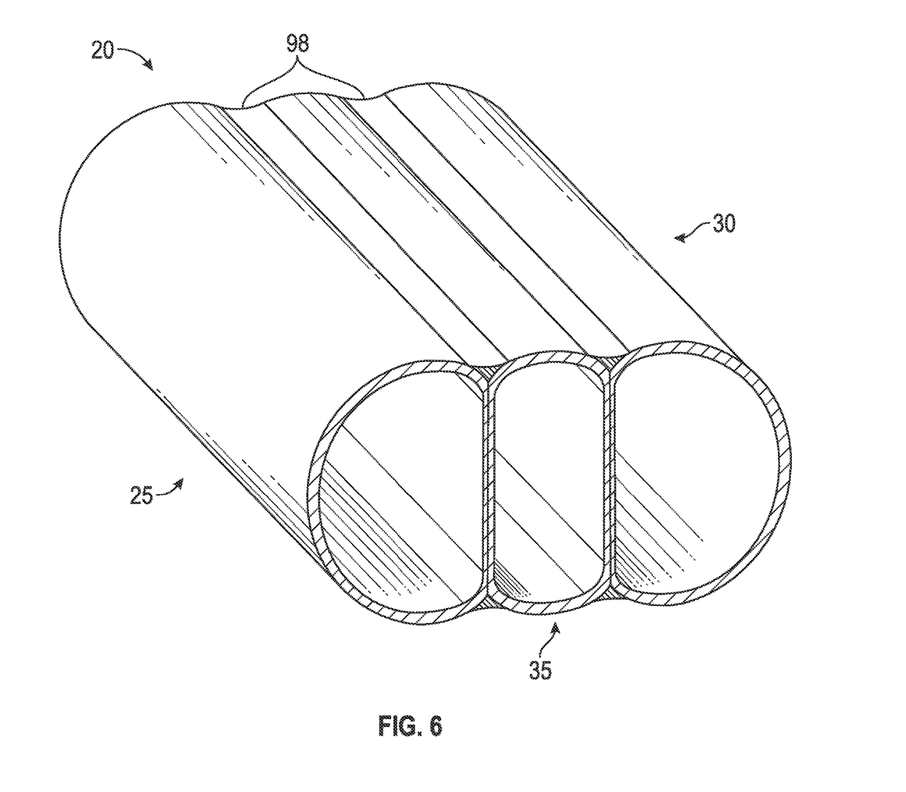
FIG. 6 is a perspective view of a portion of the pressure vessel according to an embodiment of the invention.

As illustrated in FIG. 6, adjacent lobes 25, 30, 35 of the pressure vessel 20 are coupled with one or more bonds 98 positioned at the points of tangency 70, 75 The bonds 98 are configured to transmit the tensile load on the curved walls 40, 60, 65 between the plurality of lobes 25, 30, 35. The bonds 98 are sized to provide adequate strength and load path to allow a balanced load share between outer walls 40, 60, 65 with vertical interior walls 45, 50 and 55. Exemplary processes for fabricating these bonds 98 include, but are not limited to, fusion welding, such as arc laser or electron beam welding, solid state welding, such as friction stir welding, linear friction welding, brazing, and transient liquid phase bonding for example, depending on the selected tank material.

Figure 7:
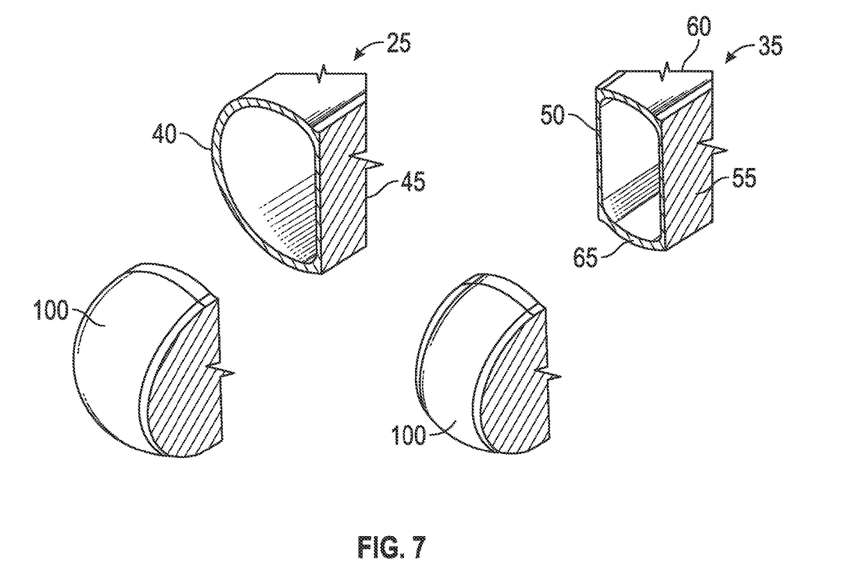
FIG. 7 is an exploded perspective view of a pressure vessel according to an embodiment of the invention.
Figure 8:
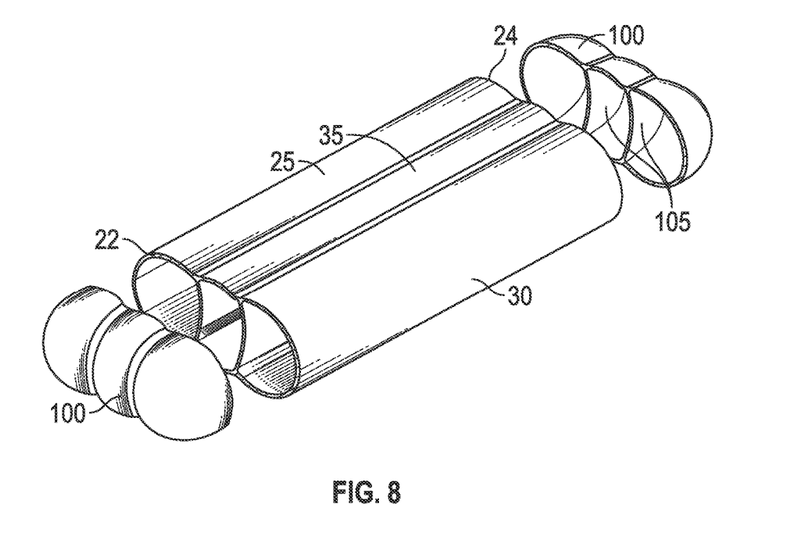
FIG. 8 is an exploded perspective view of a pressure vessel according to an embodiment of the invention.

Referring now to FIGS. 7 and 8, an end cap 100 is mounted, such as with a flash butt weld for example, at both a first end 22 and a second, opposite end 24 of each of the plurality of lobes 25, 30, 35 of the pressure vessel 20. The plurality of end caps 100 mounted to an end 22, 24 of each of the lobes 25, 30 35, may be separate (FIG. 7) or may be integrally formed (FIG. 8). In embodiments where the end caps 100 are integrally formed, the end caps 100 include an internal support 105 generally aligned with each adjacent interior wall 45, 50, 55 of the pressure vessel 20. Each end cap 100 has a shape substantially complementary to the shape of the adjacent lobe 25, 30, 35 of the pressure vessel 20. In one embodiment, each end cap 100 includes a portion of a sphere having a radius equal to the radius of curvature R. As a result, the end caps 100 configured to couple to the end lobes 25, 30 include a greater portion of a sphere than the end cap(s) 100 configured to couple to the interior lobes 35. Referring again to FIG. 4, the end caps 100 of an end lobe 25, 30 including one or more integrally formed cylindrical segments 80 have a geometry substantially complementary to the adjacent end lobes 25, 30. As a result, the end cap 100 includes a portion of a sphere having a radius equal to the radius of curvature of the cylindrical segment 80 and a portion of a sphere having a radius equal to the radius of curvature of the outer wall 40.

The lobes 25, 30, 35 of the pressure vessel 20 generally may be fabricated front a high strength metal or composite material. The end lobes 25, 30 and the interior lobes 35 may be formed by any of a number of manufacturing processes, including, but not limited to, extrusion, forging, squeeze casting, roll forming, and laser forming for example. End caps 100 may be fabricated similarly from a high strength metal or composite material, and by a process including but not limited to stamping, forging, squeeze casting, impact extrusion, and machining for example. An embodiment of tank 20 may be fabricated from a composite by a process including, but not limited to weaving, braiding, filament winding, ply layups for example. These processes may be used individually or in combination to fabricate individual or conjoined tubes to produce the final geometry as conveyed in FIG. 3.

Figure 9:
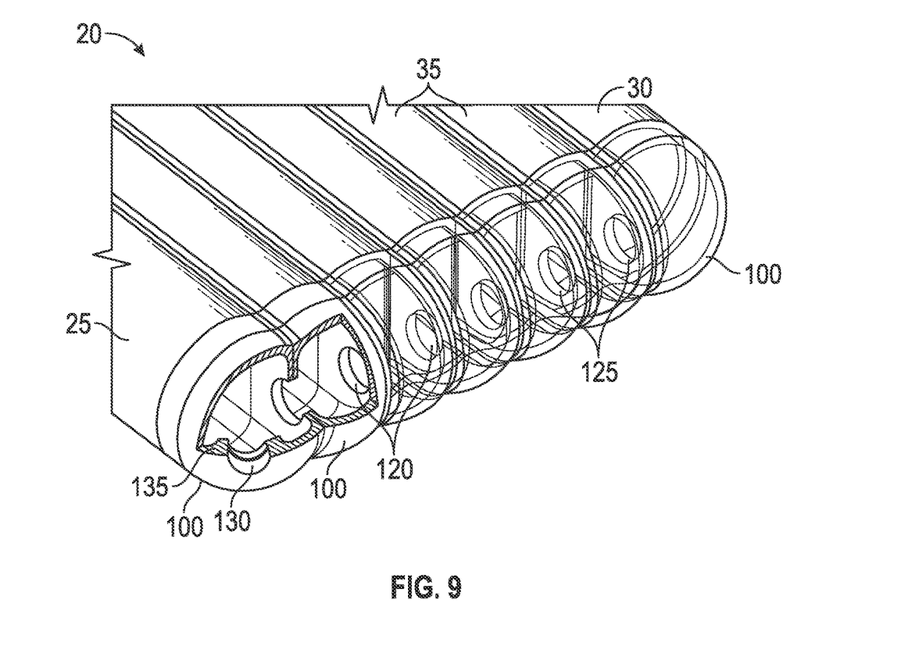
FIG. 9 is a perspective, partially see-thru view of an end of the pressure vessel according to an embodiment of the invention.
Figure 10:
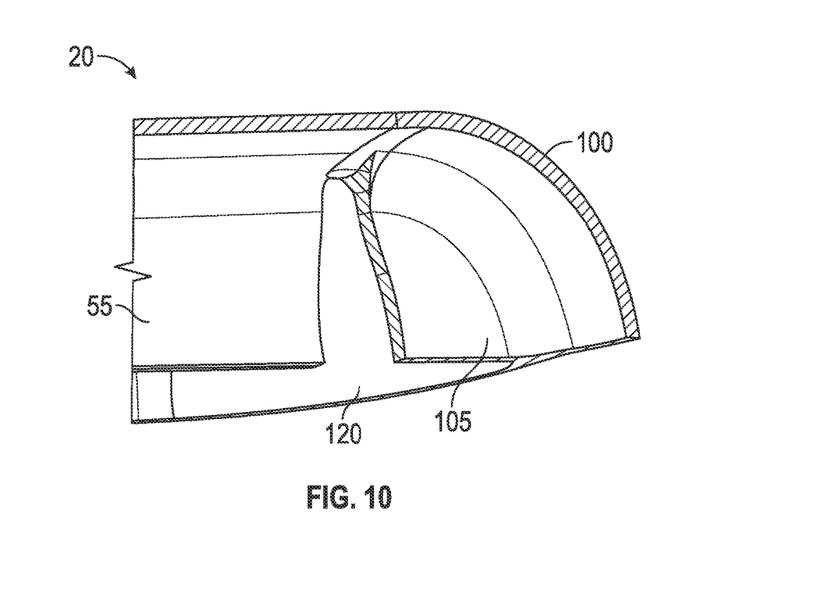
FIG. 10 is a partial cross-sectional view of a pressure vessel according to an embodiment of the invention.

Referring now to FIGS. 9-10, the pressure vessel 20, may include a plurality of openings 120 such that the pressurized fluid arranged therein may communicate between the plurality of lobes 25, 30, 35. Each of the plurality of openings 120 is generally aligned and may be formed in either an interior wall 40, 50, 55 of a lobe, or in the sidewall or internal support 105 of each end cap 100. In one embodiment, a sealing element 125 having a length greater than double the thickness of the interior wall 45, 50, 55 is arranged within each opening 120 to prevent the pressurized fluid from leaking between the adjacent interior walls 45, 50 55. Exemplary sealing elements include, but are not limited to, a metal O-ring, an e-seal, and a seal formed from a shrink metal alloy for example. In embodiments W here the plurality of lobes 25, 30, 35 are fluidly coupled within the interior of the pressure vessel 20, one of the end caps 100 includes a port 130 configured to connect the pressure vessel 20 to an engine or to a system for refilling the pressurized fluid (not shown) stored therein. In one embodiment, an internal boss 135 is configured to surround the port 130 formed in the end cap 100.

Figure 11:
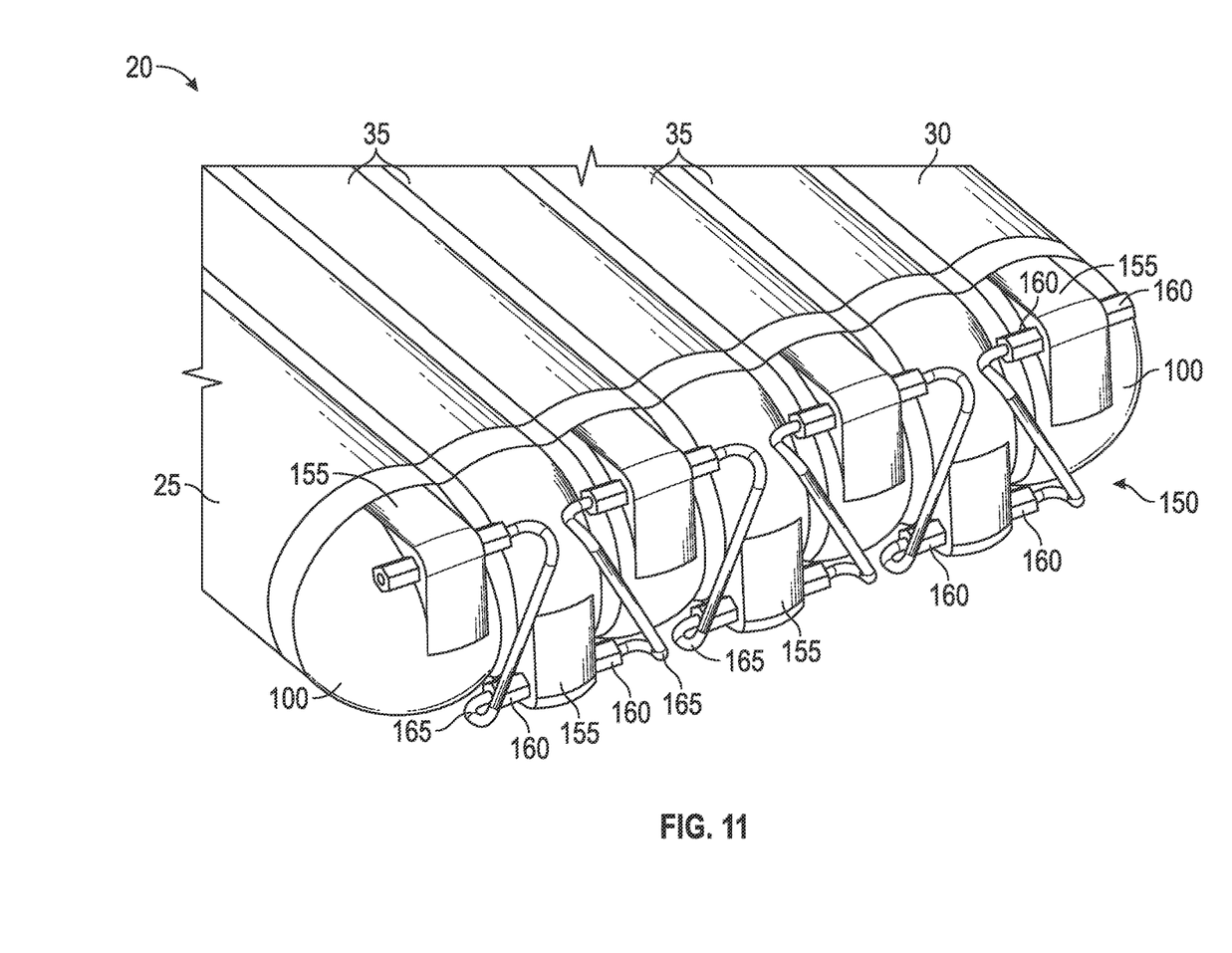
FIG. 11 is a perspective view of an end of a pressure vessel according to an embodiment of the invention.

In another embodiment, illustrated in FIG. 11, the plurality of lobes 25, 30, 35 may be fluidly coupled via an external manifold 150. An external boss 155 is formed on the exterior of the end cap 100, adjacent each lobe 25, 30, 35 of the pressure vessel 20. Each external boss 155 includes a first through hole (not shown) arranged generally parallel to the horizontal plane H and a second through hole (not shown) extending perpendicularly from the first through hole into the interior of pressure vessel 20. A connector 160, fluidly coupled to the first through hole, and therefore to the interior of the pressure vessel 20, is mounted to both sides of each boss 155. A piece of tubing 165 extends from a connector 160 of a first external boss 155a to a connector 160 of a second external boss 155b. In one embodiment, the position of the external boss 155 on an end cap 100, relative to each lobe 25, 30, 35, may alternate such that the tubing 165 extending between adjacent connectors 160 is arranged in a Z-shape. One of these connectors 160 may be fluidly coupled to engine or to a system for refilling the pressurized fluid (not shown) stored therein. Additionally, the external manifold 150 may be used to fluidly couple a plurality of stacked pressure vessels 20.

The pressure vessel 20 has a significantly higher conformability (ratio of volume of pressurized fluid that can be stored within the pressure vessel to the equivalent rectangular envelope) than conventional pressure vessels for storing a pressurized fluid. The high conformability of the pressure vessel 20 is a result of the geometry, which has been optimized to share the loads and minimize the stresses, such as hoop stress for example, on the interior and outer walls 40, 45, 50, 55, 60, 65 of the conjoined lobes 25, 30, 35 under internal pressure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pressure vessel configured to store a pressurized fluid comprising:
    a plurality of lobes, each lobe including at least one vertically oriented interior wall, the plurality of lobes being positioned in a side by side configuration such that a first interior wall of a first lobe is positioned adjacent a second interior wall of a second, adjacent lobe, the first interior wall and the second interior wall are configured to contact one another at a first point of tangency, and a first tangent contacts the first lobe at the first point of tangency and a second tangent contacts the second lobe at the first point of tangency such that the first tangent and the second tangent are separated by 120 degrees.

2. The pressure vessel according to claim 1, wherein the first point of tangency is arranged in a vertical plane positioned between the first interior wall and the second interior wall.

3. The pressure vessel according to claim 2, wherein both the first tangent and the second tangent are arranged at a 120 degree angle from the vertical plane.

4. The pressure vessel according to claim 3, wherein the pressure vessel is substantially symmetrical about a horizontal plane.

5. The pressure vessel according to claim 4, wherein the first lobe and the second lobe are configured to contact one another at a second point of tangency.

6. The pressure vessel according to claim 5, wherein the second point of tangency is arranged in the vertical plane such that a third tangent contacts the first lobe at the second point of tangency and a fourth tangent contacts the second lobe at the second point of tangency, wherein the third tangent and the fourth tangent are separated by about 120 degrees.

7. The pressure vessel according to claim 1, wherein the plurality of lobes includes a left end lobe and a right end lobe.

8. The pressure vessel according to claim 7, wherein the left end lobe and the right end lobe are substantially identical and are rotated 180 degrees relative to one another.

9. The pressure vessel according to claim 7, wherein the left end lobe and the right end lobe include a curved outer wall connected to an interior wall, and a curvature of the curved outer wall is defined by a radius.

10. The pressure vessel according to claim 9, wherein the pressure vessel has a height substantially equal to twice a length of the radius.

11. The pressure vessel according to claim 9, wherein the curved outer wall has a first thickness and the interior wall has a second thickness, the second thickness being substantially half of the first thickness.

12. The pressure vessel according to claim 9, wherein the plurality of lobes further includes at least one interior lobe.

13. The pressure vessel according to claim 12, wherein the interior lobe includes a first interior sidewall and a second interior sidewall connected by a first curved wall and a second curved wall.

14. The pressure vessel according to claim 13, wherein a curvature of the first curved wall and a curvature of the second curved wall are substantially similar and are defined by the radius.

15. The pressure vessel according to claim 14, wherein the first curved wall and the second curved wall have the first thickness and the first interior sidewall and the second interior sidewall have the second thickness.

16. The pressure vessel according to claim 1, further comprising an end cap mounted to a first end and a second, opposite end of each of the plurality of lobes.

17. The pressure vessel according to claim 16, further comprising:
a plurality of aligned openings arranged within an interior of the pressure vessel, the openings being configured to fluidly couple the plurality of lobes; and
a plurality of sealing elements, each sealing element being arranged within one of the plurality of aligned openings.

18. A pressure vessel configured to store a pressurized fluid comprising:
a plurality of lobes, each lobe including at least one vertically oriented interior wall, the plurality of lobes being positioned in a side by side configuration such that a first interior wall of a first lobe is positioned adjacent a second interior wall of a second, adjacent lobe, the first interior wall and the second interior wall are configured to contact one another at a first point of tangency, and a first tangent contacts the first lobe at the first point of tangency and a second tangent contacts the second lobe at the first point of tangency such that the first tangent and the second tangent are separated by about 120 degrees, wherein the plurality of lobes include a left end lobe and a right end lobe, and wherein the left end lobe and the right end lobe include a curved outer wall connected to an interior wall, and a curvature of the curved outer wall is defined by a radius; and
a cylindrical segment integrally formed with the curved outer wall of at least one of the left end lobe and the right end lobe, the cylindrical segment being arranged at a 45 degree angle from an origin of the radius.

19. The pressure vessel according to claim 18, wherein the cylindrical segment is configured to contact the curved outer wall at a third point of tangency, and a fifth tangent intersects the cylindrical segment at the third point of tangency and a sixth tangent intersects the cylindrical segment at the third point of tangency such that the fifth tangent and the sixth tangent are separated by about 120 degrees.

20. A pressure vessel configured to store pressurized fluid comprising;
a plurality of lobes, each lobe including at least one vertically oriented interior wall, the plurality of lobes being positioned in a side by side configuration such that a first interior wall of a first lobe is positioned adjacent a second interior wall of a second, adjacent lobe, the first interior wall and the second interior wall are configured to contact one another at a first point of tangency, and a first tangent contacts the first lobe at the first point of tangency and a second tangent contacts the second lobe at the first point of tangency such that the first tangent and the second tangent are separated by about 120 degrees;
an end cap mounted to a first end and a second, opposite end of each of the plurality of lobes;
an external manifold mounted to the end caps and configured to fluidly couple to each of the plurality of lobes;
an external boss formed on the exterior of each end cap, adjacent each lobe, each external boss including a first through hole arranged generally parallel to a horizontal plane and a second through hole extending perpendicularly from the first through hole into the interior of the pressure vessel;
a connector fluidly coupled to the first through hole and to the interior of the pressure vessel and being mounted to both sides of each boss;
a piece of tubing extending from a connector of a first external boss to a connector of a second external boss; and
the position of the external boss on an end cap relative to each lobe is alternating such the the tubing extending between adjacent connectors is arranged in a Z-shape.

\* \* \* \* \*